(12) United States Patent
Lehman et al.

(10) Patent No.: US 9,570,069 B2
(45) Date of Patent: Feb. 14, 2017

(54) SECTIONED MEMORY NETWORKS FOR ONLINE WORD-SPOTTING IN CONTINUOUS SPEECH

(71) Applicant: Disney Enterprises, Inc., Burbank, CA (US)

(72) Inventors: Jill F. Lehman, Pittsburgh, PA (US); Pallavi N. Baljekar, Pittsburgh, PA (US); Rita Singh, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 172 days.

(21) Appl. No.: 14/481,372

(22) Filed: Sep. 9, 2014

(65) Prior Publication Data
US 2016/0071515 A1 Mar. 10, 2016

(51) Int. Cl.
*G10L 15/02* (2006.01)
*G10L 15/16* (2006.01)
*G10L 15/08* (2006.01)

(52) U.S. Cl.
CPC .......... *G10L 15/16* (2013.01); *G10L 2015/088* (2013.01)

(58) Field of Classification Search
CPC .......... G10L 15/02; G10L 15/08; G10L 15/14; G10L 15/142; G10L 15/144; G10L 15/146; G10L 15/148; G10L 15/16; G10L 15/063
USPC ...... 704/1–10, 200, 202, 232, 251–257, 259
See application file for complete search history.

(56) References Cited

U.S. PATENT DOCUMENTS

| | | | | |
|---|---|---|---|---|
| 5,170,432 A * | 12/1992 | Hackbarth | ............. | G10L 15/07 704/254 |
| 5,613,037 A * | 3/1997 | Sukkar | .................. | G10L 15/142 704/251 |
| 5,873,061 A * | 2/1999 | Hab-Umbach | ....... | G10L 15/142 704/251 |
| 6,772,117 B1 * | 8/2004 | Laurila | ................... | G10L 15/20 704/233 |
| 6,782,362 B1 * | 8/2004 | Hon | ........................ | G10L 15/14 704/240 |
| 8,543,399 B2 * | 9/2013 | Jeong | ...................... | G10L 15/08 704/231 |
| 9,286,888 B1 * | 3/2016 | Lee | ......................... | G10L 25/93 |
| 2007/0162283 A1 * | 7/2007 | Petrushin | ............... | G10L 17/26 704/255 |
| 2015/0095027 A1 * | 4/2015 | Parada San Martin | . | G10L 15/02 704/232 |

OTHER PUBLICATIONS

"Speech Signal Processing" from The HTK Book (for HTK Version 3.1), Steve Young, Gunnar Evermann, Dan Kershaw, Dan Kershaw, Julian Odell, Dave Ollason, Valtcho Valtchev, & Phil Woodland, © 2001-2002 Cambridge University Engineering Department, 2002 (no month available).*

(Continued)

*Primary Examiner* — Marivelisse Santiago Cordero
*Assistant Examiner* — Stephen Brinich
(74) *Attorney, Agent, or Firm* — Patterson + Sheridan, LLP

(57) ABSTRACT

Systems, methods, and computer program products to detect a keyword in speech, by generating, from a sequence of spectral feature vectors generated from the speech, a plurality of blocked feature vector sequences, and analyzing, by a neural network, each of the plurality of blocked feature vector sequences to detect the presence of the keyword in the speech.

21 Claims, 5 Drawing Sheets

(56) References Cited

OTHER PUBLICATIONS

R.C. Rose and D.B. Paul, "A Hidden Markov Model Based Keyword Recognition System," International Conference on Acoustics, Speech, and Signal Processing (ICASSP),1990.
T. Ezzat, T. Poggio, "Discriminative Word-Spotting Using Ordered Spectro-Temporal Patch Features," SAPA workshop, Interspeech,Brisbane, Australia, 2008.
S.Fernandez, A. Graves, J. Schmidhuber, "An Application of Recurrent Neural Networks to Discriminative Keyword Spotting", In: Proc. ICANN, Porto, Portugal, pp. 220-229, 2007.
T. J. Hazen, W. Shen and C. White, "Query-by-example Spoken Term Detection Using Phonetic Posteriogram Templates", Proceedings of the IEEE Workshop on Automatic Speech Recognition and Understanding, Merano, Italy, Dec. 2009.
A. Jansen, and P. Niyogi, "Point process models for spotting keywords in continuous speech," IEEE Transactions on Audio, Speech, and Language Processing, 17, No. 8 , pp. 1457-1470, 2009.
A. Mohamed, T. N. Sainath, G.Dahl, B. Ramabhadran, G. E. Hinton and M. A. Picheny, "Deep Belief Networks using Discriminative Features for Phone Recognition," in ICASSP, 2011.
T. N. Sainath, A. Mohamed, B. Kingsbury, B. Ramabhadran, "Deep Convolutional Neural Networks for LVCSR", in ICASSP , Vancouver, Canada, 2013.
A. Graves, A. Mohamed, G. Hinton, "Speech Recognition with Deep Recurrent Neural Networks," in ICASSP 2013, Vancouver, Canada, 2013.
G. Dahl, M. Ranzato, A. Mohamed, G. Hinton, "Phone Recognition with the Mean-Covariance Restricted Boltzmann Machine, " In Advances in Neural Information Processing Systems 23, pp. 469-477,2010.
A. Graves and J. Schmidhuber, "Framewise Phoneme Classification with Bidirectional LSTM Networks,"In Proc. International Joint Conference on Neural Networks IJCNN, 2005.
M. Schuster and K. K. Paliwal, "Bidirectional recurrent neural networks," IEEE Transactions on Signal Processing, 45, No. 11, pp. 2673-2681,1997.
T. Lin, B. G. Home, P. Tino, and C. L. Giles, "Learning Long-term Dependencies in NARX Recurrent Neural Networks." IEEE Transactions on Neural Networks, vol. 7, No. 6 ,pp. 1329-1338,1996.
F. A. Gers, "Long Short-Term Memory in Recurrent Neural Networks", PhD thesis, Department of Computer Science, Swiss Federal Institute of Technology, Lausanne, EPFL, Switzerland, 2001.
S. Hochreiter and J. Schmidhuber,"Long Short-Term Memory," Neural Computation,9(8): 1735-1780, 1997.
F. A. Gers, J. Schmidhuber, and F. Cummins. "Learning to Forget: Continual Prediction with LSTM". Neural Computation, 12(10), pp. 2451-2471, 2000.
F. Gers, N. N. Schraudolph, and J. Schmidhuber. "Learning Precise Timing with LSTM Recurrent Networks," The Journal of Machine Learning Research 3, pp. 115-143, 2003.
A. Graves, Supervised Sequence Labelling with Recurrent Neural Networks. Textbook, Studies in Computational Intelligence, Springer, 2012.
A. Graves, S. Fernndez, M. Liwicki, H. Bunke and J. Schmidhuber, "Unconstrained Online Handwriting Recognition with Recurrent Neural Networks", NIPS 2007, Vancouver, Canada, 2007.
A. Graves, S. Fernndez, F. Gomez, J. Schmidhuber, "Connectionist Temporal Classification: Labelling Unsegmented Sequence Data with Recurrent Neural Networks," ICML, Pittsburgh, USA, pp. 369-376, 2006.
M. Wollmer, F. Eyben, A. Graves, B. Schuller and G. Rigoll, "Improving Keyword Spotting with a Tandem BLSTM-DBN Architecture," in Non-Linear Speech Processing, J. Sole-Casals and V. Zaiats (Eds.), LNAI 5933, pp. 68-75, Springer Heidelberg, 2010.
M. Wollmer, F. Eyben, B. Schuller, Y. Sun, T. Moosmayr and N. Nguyen-Thien: "Robust In-Car Spelling Recognition—A Tandem BLSTM-HMM Approach," in Proc. of Interspeech, ISCA, pp. 2507-2510, Brighton, UK, 2009.
Y. Sun, T. Bosch, and L. Boves, "Hybrid HMM/BLSTM-RNN for Robust Speech Recognition," In Proceedings of the 13th International Conference on Text, Speech and Dialogue pp. 400-407. Springer-Verlag, Sep. 2010.
S. Hochreiter, Y. Bengio, P. Frasconi and J. Schmidhuber, "Gradient Flow in Recurrent Nets: The Difficulty or Learning Long Term Dependencies," in a Field Guide to Dynamical Recurrent Neural Networks, IEEE Press, 2001.
Alex Graves, RNNLIB: A recurrent neural network library for sequence learning problems. Online: http://sourceforge.net/projects/mnl/. Retrieved Jun. 25, 2015.
J. F. Kolen and J. B. Pollack, "Backpropagation is Sensitive to Initial Conditions," Advances in Neural Information Processing Systems, pp. 860-867, 1990.
P. Baljekar, et al.: "Online Word-Spotting in Continuous Speech With Recurrent Neural Networks", 2014 Spoken Language Technology Workshop, Dec. 7-10, 2014, South Lake Tahoe, NV.

* cited by examiner

SECTIONED MEMORY NETWORKS FOR ONLINE WORD-SPOTTING IN CONTINUOUS SPEECH

BACKGROUND

Field of the Disclosure

Embodiments disclosed provide techniques for detecting words in human speech. More specifically, embodiments disclosed herein relate to sectioned memory networks for online word-spotting in continuous speech.

Description of the Related Art

Software applications may be used to detect the presence of specific words in human speech, commonly referred to as "speech-recognition." Traditionally, however, computers have been programmed to detect phonemes (a perceptually distinct unit of sound) and not entire words. Doing so allows software to piece the phonemes together to determine if (and what) word was spoken. Furthermore, existing techniques use hidden Markov models to search for the words, while using neural networks only to compute features of the speech. Such techniques leave much to be desired in terms of the accuracy and speed of detecting words in speech.

SUMMARY

Embodiments disclosed herein provide at least systems, methods, and computer program products to detect a keyword in speech, by generating, from a sequence of spectral feature vectors generated from the speech, a plurality of blocked feature vector sequences, and analyzing, by a neural network, each of the plurality of blocked feature vector sequences to detect the presence of the keyword in the speech.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
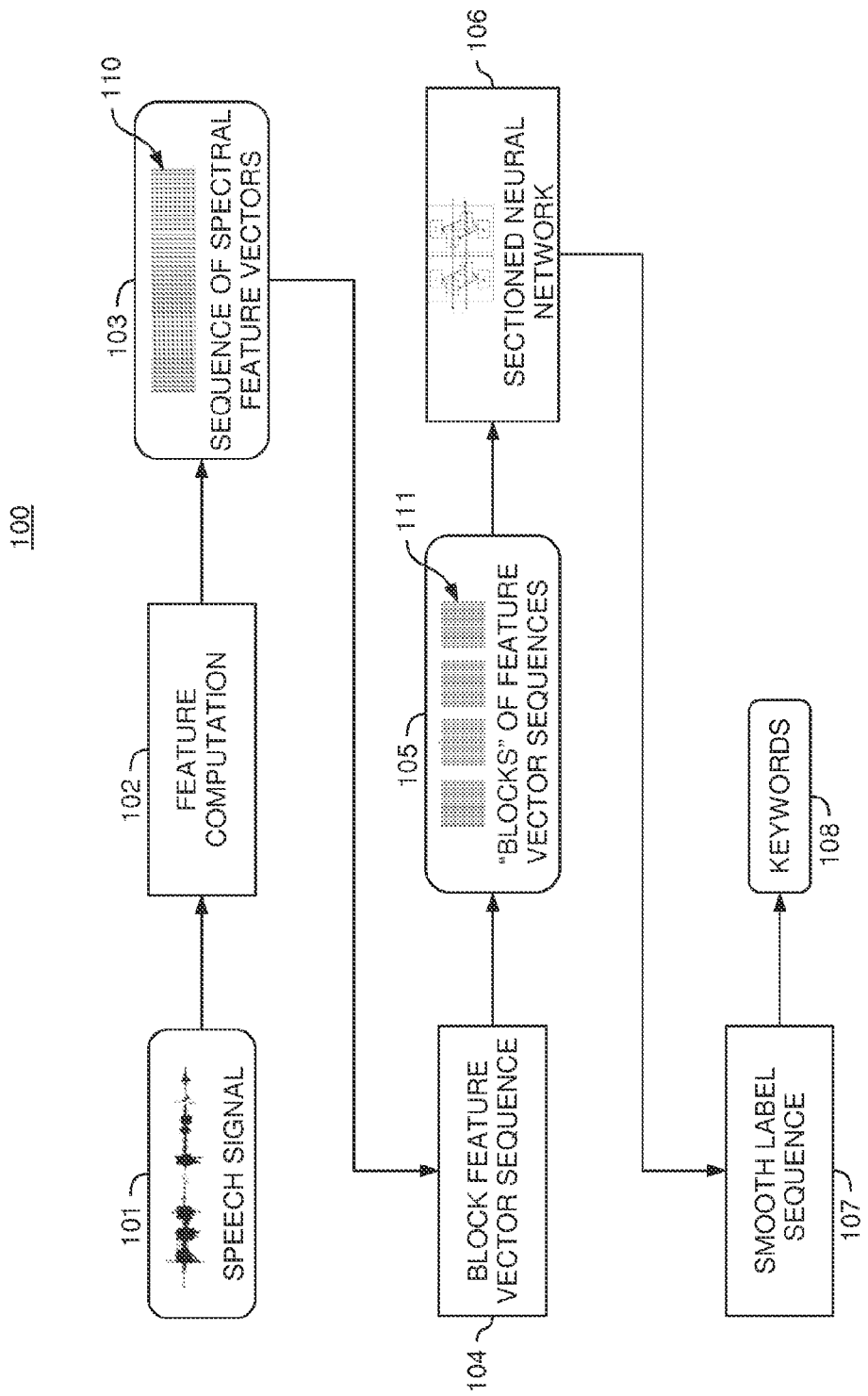
FIG. 1 is a flow diagram illustrating techniques for sectioned memory networks to perform online word-spotting in continuous speech, according to one embodiment.

Embodiments disclosed herein provide techniques for identifying keywords in human speech directly through a neural network, without having to search a keyword lattice. Specifically, embodiments disclosed herein use a recurrent neural network architecture to identify words, and not non-word phonemes, such that the output of the neural network is an indication of whether a given keyword (rather than a given non-word phone) was present or absent in the speech.

In response to receiving speech (through, for example, a microphone, audio file, or other data stream), embodiments disclosed herein perform a feature computation on the speech to create a sequence of feature vectors for the speech. Each vector in the sequence may correspond to a segment of the speech. Embodiments disclosed herein partition the sequence of feature vectors in order to create a set of blocked feature vectors. Each block in the set of blocked feature vectors may correspond to a portion of the sequence of feature vectors. Additionally, the blocks may be overlapping, such that adjacent blocks may overlap with each other (by, for example, and without limitation, 10 milliseconds of speech). The neural network may be sectioned, such that each section (or block) of the neural network processes a respective block of the set of blocked feature vectors. In at least one embodiment, each section of the neural network is identical, and the neural network is a large neural network comprising many identical sections, where each section processes a respective segment of the input. The output of each section of the sectioned neural network may be an indication as to whether the keyword was present in the respective block of feature vectors processed by the block of the neural network. The output of the neural network may then be smoothed in order to refine the output, and return a final decision as to the presence or absence of the keyword.

As used herein, a keyword refers to any word that is to be classified or verified in human speech. For example, if the keyword is "cat," embodiments disclosed herein process human speech to determine whether the word "cat" is was spoken by the speaker in the speech. The keyword may be one of a plurality of keywords. In addition, multiple keywords may be classified or verified against the speech. The speech may comprise a stream of speech by one or more speakers, which may largely comprise words outside of the desired set of keywords. Advantageously, embodiments disclosed herein may detect these keywords using a uniform segmentation, without knowing the exact beginning and ending times of the keywords in the speech (if the keywords are indeed present in the speech).

Generally, any type of neural network may be used to implement the techniques described herein. For example, and without limitation, feedforward networks, time-delay neural networks, recurrent neural networks and convolutive neural networks, may be used. Any reference to a specific type of neural network herein should not be considered limiting of the disclosure.

FIG. 1 is a flow diagram 100 illustrating techniques for sectioned memory networks to perform online word-spotting in continuous speech, according to one embodiment. As shown, the flow begins at block 101, where a speech signal is received. The speech signal may be in any format and may be captured by any feasible method. The speech signal may be in the time domain.

At block 102, a feature computation may be performed on the speech signal. The feature computation processes predefined intervals of the speech signal, such as 25 milliseconds, in order to produce a feature vector for each interval (e.g., a feature vector for each 25 millisecond interval of the speech signal). In at least one embodiment, the intervals may be shifted (or overlap adjacent intervals) by a predefined amount of time, such as 10 milliseconds. Therefore, in such embodiments, one second of speech may result in 100 feature vectors. The output of the feature computation is a sequence of spectral feature vectors, shown at block 103. Each bar 110 of the sequence may represent a single feature vector, while the series of bars 110 represents the sequence of feature vectors. The sequence of spectral feature vectors may be, in at least one embodiment, a 13-dimensional Cepstral vector. The speech signal, therefore, may become a long, continuous sequence of feature vectors. The sequence of spectral feature vectors includes a feature vector for each respective interval of the speech signal. By performing the feature computation, the speech signal may be transformed from the time domain into the spectral domain. Each vector in the sequence of feature vectors may define one or more attributes of each respective interval of speech.

At block 104, the sequence of feature vectors may be blocked (or partitioned) into blocks (or segments) of feature vectors. The blocks may be overlapping, such that adjacent blocks may overlap each other, with each adjacent block including at least one common feature vector in the sequence of feature vectors. The size of the blocks of feature vectors may be any size (such as 5, 10, or 20 feature vectors). Furthermore, the size parameter of the blocks may be based on a size of the keywords being searched, such that longer keywords are provided larger blocks, while shorter keywords are provided smaller blocks. The size of the blocks may be determined during a training phase of the blocked neural network, described in greater detail below. The output of the blocking of the feature vector sequence is depicted by a plurality of blocks 111 of feature vector sequences at block 105.

At block 106, the blocks of feature vector sequences may be processed by a sectioned neural network. In at least one embodiment, each section of the neural network may process a respective block of feature vectors. The sectioned neural network may be trained to identify one or more keywords. As such, each section of the neural network hypothesizes over the presence of each of the keywords. The sections of the neural network may intercommunicate with each other, but each section may be viewed as a separate network. The sections of the neural network may be interconnected with the size of the blocks of feature vectors to optimize processing of the blocks of feature vectors by the sections of the neural network. The output of each section of the neural network is a sequence of labels, each of which indicates the presence or absence of a keyword (or keywords). The presence of a given keyword may be based on a threshold value, such that an output of each section of the neural network, if greater than the threshold value, indicates the presence of the keyword. For example, an output of the neural network may be the value 0.73, and a threshold may be 0.5. Since 0.73 is greater than 0.5, a keyword is indicated. In other embodiments, soft functions may be applied to the output of each section of the neural network in order to determine whether the keyword is present.

The output of labels generated by the neural network may be smoothed at block 107. The output of the smoothing may be a final result 108 which provides an indication whether the keyword(s) are present from the speech. The result may then be output to a user in any format sufficient to convey which, if any of the keywords 108 was detected in the speech.

Figure 2:
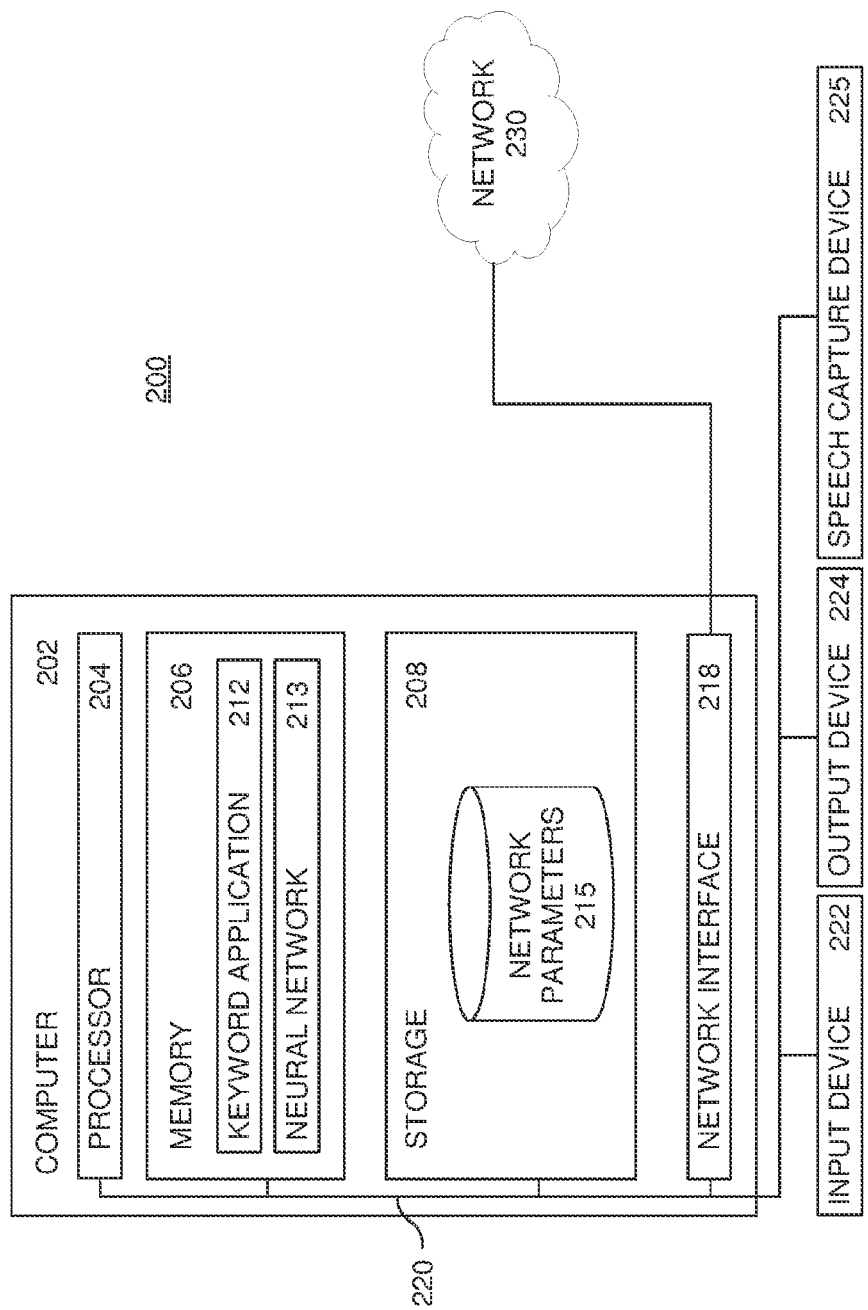
FIG. 2 is a block diagram illustrating a system for sectioned memory networks to perform online word-spotting in continuous speech, according to one embodiment.

FIG. 2 is a block diagram illustrating a system for sectioned memory networks to perform online word-spotting in continuous speech, according to one embodiment. The networked system 200 includes a computer 202. The computer 202 may also be connected to other computers via a communications network 230. In general, the communications network 230 may be a telecommunications network and/or a wide area network (WAN). In a particular embodiment, the communications network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the communications network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used. The speech capture device 225 may be any device configured to capture sounds, such as speech, and convert the sound into a digital signal understandable by the computer 202. For example, and without limitation, the speech capture device 225 may be a microphone.

As shown, the memory 206 contains the keyword application 212, which is an application generally configured to detect the presence of keywords in human speech. When the keyword application 212 receives a speech signal from the speech capture device 225, the keyword application 212 may perform a feature computation on the speech signal to produce a sequence of spectral feature vectors. Each spectral feature vector may correspond to an interval of the speech signal, such as 25 milliseconds. Each spectral feature vector may be overlapping, such that adjacent spectral feature vectors in the sequence are based at least in part on the same portion of the speech signal. The keyword application 212 may then divide the sequence of spectral feature vectors into a plurality of blocks, where each block includes one or more spectral feature vectors, of the sequence of spectral feature vectors. The blocks of spectral feature vectors may be overlapping, such that adjacent blocks include at least one common spectral feature vector. The keyword application 212 may then pass the blocks of spectral feature vectors to the neural network 213. The neural network 213 may be a sectioned neural network, where each section processes a block of the blocks of spectral feature vectors. Each section of the neural network 213 may determine how to identify specific keywords during a training phase, where the neural network 213 is provided blocks of speech data and an indication of whether each block contains the keywords. The output of each section of the neural network 213 may be a label indicating the presence or absence of the keyword. The keyword application 212 may then smooth each label in order to return a response indicating whether the keyword is present in the speech. Generally, the neural network 213 may be any type of neural network, including, without limitation, a feedforward network, time-delay neural network, recurrent neural network, and convolutive neural network.

As shown, storage 208 contains the network parameters 215. Generally, the neural network parameters 315 are parameters related to the configuration of the neural network 213. The neural network parameters 315 may include, without limitation, optimal block sizes for blocks of spectral feature vectors for each of a plurality of keywords. The block sizes may be used to optimize the blocks of the neural network 213.

Figure 3:
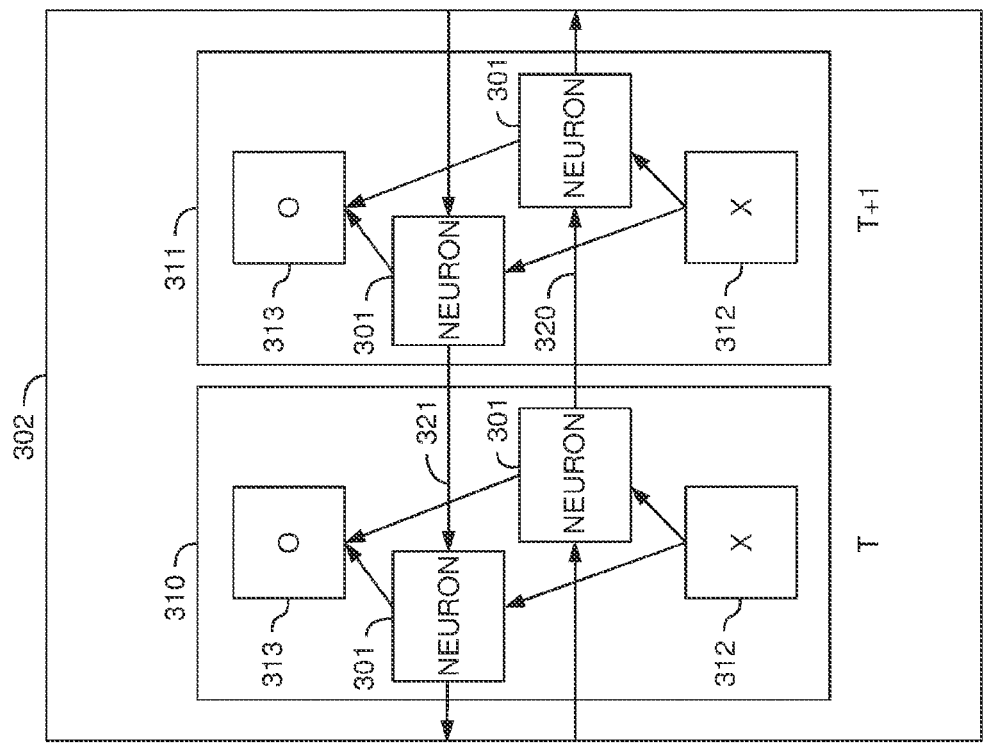
FIG. 3 illustrates components of a neural network, according to one embodiment.
Figure 3:
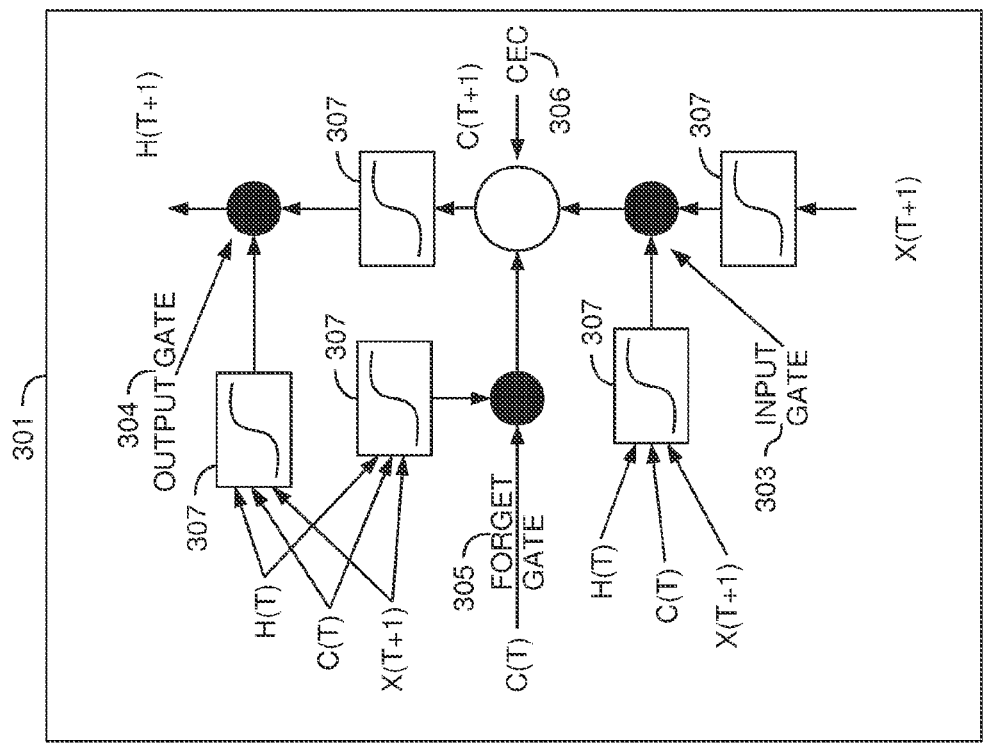

FIG. 3 illustrates components of the neural network 213, according to one embodiment. The components include a memory neuron 301 that becomes part of a bi-directional network 302. As shown, the memory neuron 301 includes four components, an input gate 303, an output gate 304, a forget gate 305, and a constant error carousel (CEC) 306. The excitation of the CEC 306 is gated by the input gate 303 and the forget gate 305, each of which control the flow of input signals to the CEC 306. The input gate 303 is opened and closed based on the current values of other input signals (not shown). The dependency may be automatically determined based on training data. The gates 303 and 305 may eliminate harmful inputs, and indicate which input is significant (and in which situations), therefore providing an in insight into the input-output relationship of the training data.

As shown, the network 302 includes two exemplary nodes, or blocks, 310 and 311. Each node includes a forward network 320 and a reverse (or backward) network 321. The memory neurons 301 configured to capture both forward and backward recurrences as part of the forward network 320 and the backward network 321, respectively. The forward and backward recurrences may be independent of each other, but the gated output values of both the forward and backward networks 320, 321 combine to contribute to the final output of the network. As shown, each neuron 301 is served by a respective input 312 and writes to an output 313.

Each of the gates may be a non-linear function f( ) that operates on the combination of the inputs to the gate to output a value between 0 and 1. Gates generally control the flow of other signals by multiplying the signal by the value of the output of the gate. When the output of the gate is 0, the signals it controls are reduced to 0. When the gate output is 1, the signals it controls are passed through unmodified. Intermediate gate output values pass the signals through with attenuation.

Overall, one embodiment of the operation of each of the three gates is as follows. Let X(T) be the input at time T, C(T) be the output of the CEC at time T, and the output of the network at time T be H(T). The gating values of the input gates 303 and the forget gates 305 are given by the following:

$$I(T) = f(W^i_X X(T) + W^i_H H(T-1) + W^i_C C(T-1) + b_i)$$ Input gate 303:

$$F(T) = f(W^F_X X(T) + W^F_H H(T-1) + W^F_C C(T-1) + b_f)$$ Forget gate 305:

The gating value C(T), $$O(T) = f(W^O_X X(T) + W^O_H H(T-1) + W^O_C C(T-1))$$ Forget gate 305:

The output of the CEC 306, the gating value of the output gate 304, and the output 313 of the network at time T are respectively given by $$C(T) = F(T)C(T-1) + I(T)g(W^C_X X(T) + W^C_H H(T-1)b_c)$$ CEC 306:

$$O(T) = f(W^O_X X(T) + W^O_H H(T-1) + W^O_C C(T) + b_O)$$ Output gate 304:

$$H(T) = O(T)g(C(T))$$ Network output 313:

In the above equations the functions f( ) and g( ) are compressive functions. The function f( ) may be a function whose outputs lie between 0 and 1. In one embodiment, f( ) is a sigmoid function with value: $f(x) = (1+e^{-x})^{-1}$, where e is Napier's constant. The function g( ) may a function with an output between −1 and 1. In one embodiment, g( ) is the hyperbolic tan function given by g(x)=tan h(x).

Figure 4:
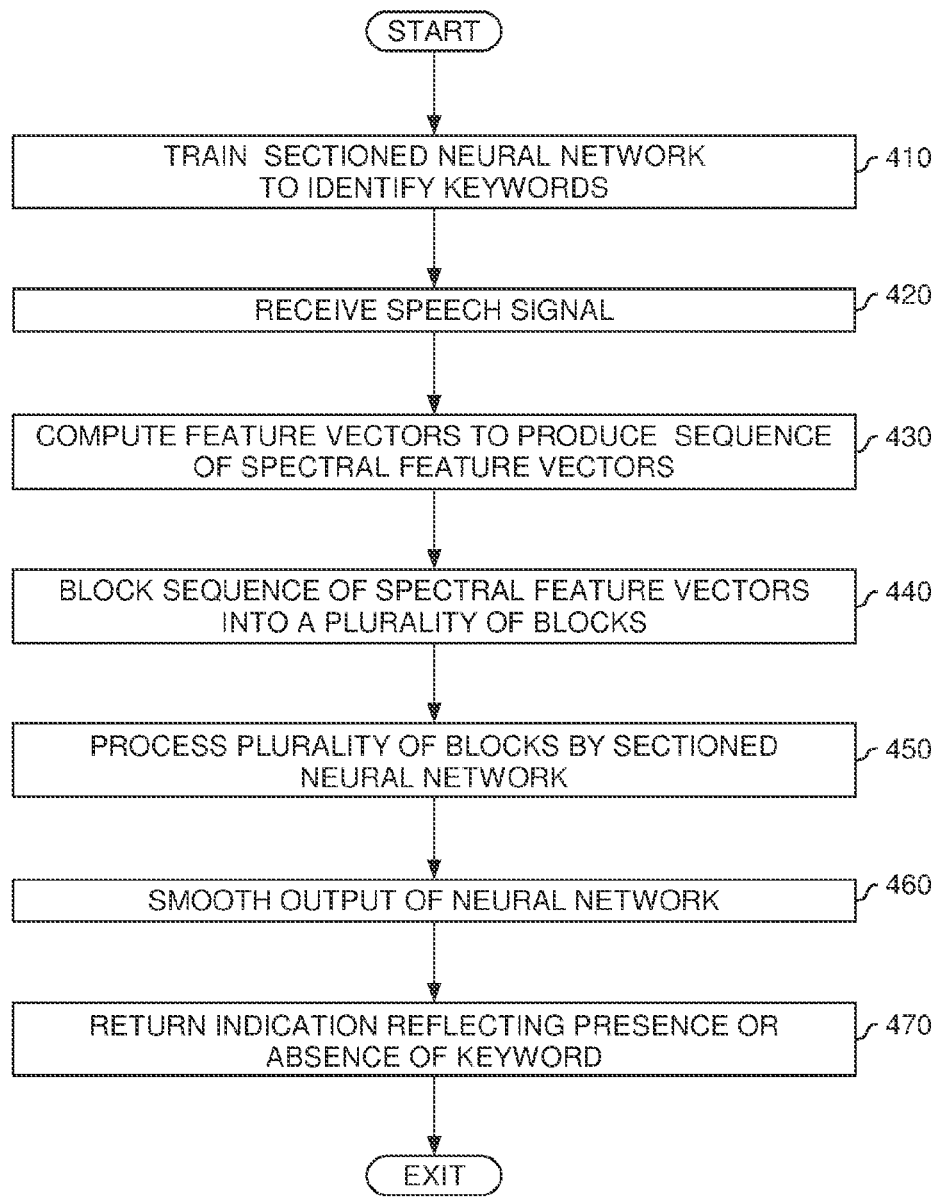
FIG. 4 illustrates a method to provide sectioned memory networks to perform online word-spotting in continuous speech, according to one embodiment.

FIG. 4 illustrates a method 400 to provide sectioned memory networks to perform online word-spotting in continuous speech, according to one embodiment. Generally, the steps of the method 400 segment a spectral feature vector sequence representing speech into blocks, and use a sectioned neural network 213 to process the blocked feature vector sequences in order to detect the presence of one or more keywords in the speech.

At step 410, the sectioned neural network 213 may be trained to detect keywords. The training phase may include providing each section of the neural network 213 with sample speech data that is known to include or not include the keywords. Over time, each section of the neural network 213 may learn how to classify keywords in the other speech signals based on the training data. Generally, any type of training database may be used to train the neural network 213. For example, the TIMIT database may be used to train the sectioned neural network 213. The TIMIT database is a corpus of phonetically and lexically transcribed speech of American English speakers, with each transcribed element being delineated in time. At step 420, the keyword application 212 may receive a speech signal. The speech signal may be any representation of human speech, such as a live stream of continuous digitized speech received from the speech capture device 225. The speech signal may also be a digital audio file including speech. In addition, the keyword application 212 may be provided one or more keywords that should be verified or classified in the speech. At step 430, the keyword application 212 may compute spectral feature vectors for each of a plurality of segments of the speech signal in order to create a sequence of spectral feature vectors for the speech signal. Each segment of the speech signal may be an interval in the speech signal, such as a 25 millisecond interval in the speech signal. The spectral feature vectors in the sequence may be overlapping, in that each spectral feature vector is based at least in part on a portion of a shared interval of the speech signal relative to adjacent spectral feature vectors.

At step 430, the keyword application 212 may block the sequence of spectral feature vectors into a plurality of overlapping blocks of feature vectors. Each block may include a predefined count of spectral feature vectors. Each block may be overlapping, in that at least one spectral feature vector is found within at least two blocks of spectral feature vectors. The block size may be defined during the training phase at step 410, and may be based on a size of the keyword. At step 450, the sectioned neural network 213 may process the plurality of blocks of spectral feature vectors. The output of each section of the neural network 213 may be a label indicating whether the respective block of spectral feature vectors includes the keyword. At step 460, the keyword application 212 may smooth the output of the neural network 213 in order to reach a final conclusion as to the verification or classification of the keyword. At step 470, the keyword application 212 may return an indication reflecting the presence or absence of the keyword. Generally, the indication may take any form suitable to indicate the presence or absence of the keyword.

Figure 5:
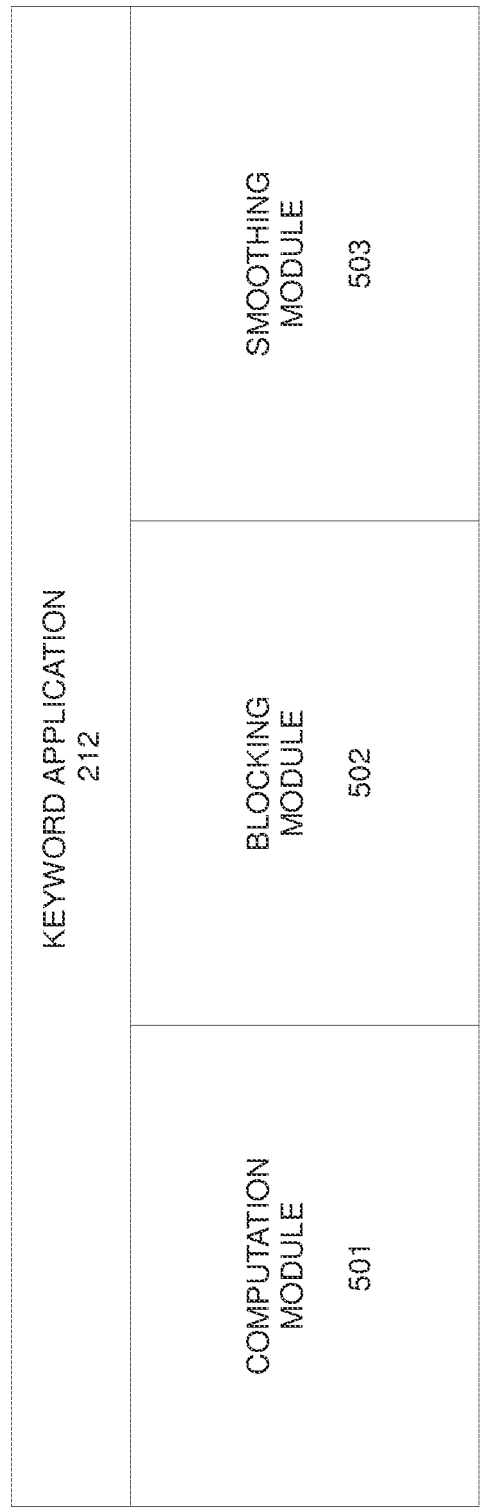
FIG. 5 illustrates components of a keyword application, according to one embodiment.

FIG. 5 illustrates components of the keyword application 212, according to one embodiment. As shown, the keyword application 212 includes a feature computation module 501, a blocking module 502, and smoothing module 503. The feature computation module 501 may be a feature classifier used to identify different features of speech. The output of the feature computation module 501 may be a spectral feature vector for a given segment, or interval of speech. For example, the feature computation module 501 may compute a feature vector 501 for 25 millisecond intervals of speech. The intervals may be overlapping. For example, the intervals may be overlapping by 10 milliseconds. In such an embodiment, the feature computation module 501 may output a sequence of 100 spectral feature vectors for one second of speech. In at least one embodiment, the spectral feature vectors are 13-dimensional Cepstral vectors.

The blocking module 502 is generally configured to create a plurality of blocks of spectral feature vectors from the sequence of spectral feature vectors generated by the feature computation module 501. In at least one embodiment, the blocks of spectral feature vectors are overlapping, such that at least one spectral feature vector is found in at least two blocks of spectral feature vectors. The blocking module 502 may create blocks of any size, which may be determined during training. The size of the blocks may be based on the size of blocks provided to the sectioned neural network 213 during training, and may further be based on the size of the keyword the sectioned neural network 213 is trained to classify or verify.

The smoothing module 503 is a module generally configured to smooth the output of the sectioned neural network 213. Generally, the smoothing may eliminate any noise from the keyword labels generated by each section of the neural network 213. The output of the neural network 213 can vary significantly from section to section, and this variation can obscure genuine detections of a word. The smoothing module 503 reduces this variation by modifying the output of the unit to conform to long-term trends, so that genuine detections of the keyword stand out against the background output levels of the network. The smoothing module 503 may therefore produce a final result indicative of the presence or absence of the keyword(s).

Although shown as part of the keyword application 212, the feature computation module 501, a blocking module 502, and smoothing module 503 may be separate applications configured to intercommunicate.

Advantageously, embodiments disclosed herein provide techniques to perform keyword searching directly in a neural network. The neural network searches directly for words, and not phonemes, and therefore does not require phonetic composition of the word. Since the neural network is capable of making decisions almost immediately as soon of as a block of speech containing the keyword is processed, the neural network may perform its computation in an online manner, providing real-time results. Furthermore, all computation is performed in a single pass, a second level search is not required.

Reference has been made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the keyword application 212 could execute on a computing system in the cloud to perform keyword verification and/or classification. In such a case, the keyword application 212 could analyze speech signals and store an indication of the presence or absence of keywords in the speech at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to detect a keyword in speech, comprising:
generating, from a sequence of spectral feature vectors generated from the speech, a plurality of blocked feature vector sequences, wherein each of the plurality of blocked feature vector sequences comprises a respective subset of the plurality of feature vectors, wherein each of the plurality of blocked feature vector sequences overlap adjacent blocked feature vector sequences by a predefined count of feature vector sequences; and
analyzing, by a neural network executing on one or more computer processors, each of the plurality of blocked feature vector sequences to detect the presence of the keyword in the speech.

2. The method of claim 1, further comprising:
prior to generating the blocked feature vector sequences:
receiving a speech signal comprising the speech; and
performing a feature computation on the speech signal to generate the sequence of spectral feature vectors.

3. The method of claim 1, wherein an output of the neural network comprises a sequence of labels, wherein each of the sequence of labels indicates whether the keyword is present in a corresponding blocked feature vector sequence, the method further comprising:
smoothing the sequence of labels to determine whether the keyword is in the speech.

4. The method of claim 1, wherein the neural network comprises a plurality of blocks, wherein each block of the neural network is configured to process a respective block of the plurality of blocked feature vector sequences.

5. The method of claim 1, wherein a count of the subset of the plurality of feature vectors in each block of the plurality of blocked feature vector sequences is defined during a training phase of the neural network, the method further comprising:
modifying the count based on a feature in the spectral feature vector, wherein the modified count is configured to increase a likelihood that the neural network will correctly detect the presence of the keyword in the speech.

6. The method of claim 1, wherein the neural network generates an output comprising an indication of the presence of keywords, and not phonemes, in the speech, wherein the method detects the keyword in the speech without using a hidden Markov model.

7. The method of claim 1, further comprising:
upon detecting the presence of the keyword in the speech, returning an indication that the keyword is present in the speech.

8. A computer program product to detect a keyword in speech, the computer program product comprising:
a non-transitory computer-readable storage medium having computer-readable program code embodied therewith, the computer-readable program code executable by a processor to perform an operation comprising:
generating, from a sequence of spectral feature vectors of the speech, a plurality of blocked feature vector sequences, wherein each of the plurality of blocked feature vector sequences comprises a respective subset of the plurality of feature vectors, wherein each of the plurality of blocked feature vector sequences overlap adjacent blocked feature vector sequences by a predefined count of feature vector sequences; and
generating, by a neural network, the plurality of blocked feature vector sequences to detect the presence of the keyword in the speech.

9. The computer program product of claim 8, the operation further comprising
prior to generating the blocked feature vector sequences:
receiving a speech signal comprising the speech; and
performing a feature computation on the speech signal to generate the sequence of spectral feature vectors.

10. The computer program product of claim 8, wherein an output of the neural network comprises a sequence of labels, wherein each of the sequence of labels indicates whether the keyword is present in a corresponding blocked feature vector sequence, the operation further comprising:
smoothing the sequence of labels to determine whether the keyword is in the speech.

11. The computer program product of claim 8, wherein the neural network comprises a plurality of blocks, wherein each block of the neural network is configured to process a respective block of the plurality of blocked feature vector sequences.

12. The computer program product of claim 8, wherein a count of the subset of the plurality of feature vectors in each block of the plurality of blocked feature vector sequences is defined during a training phase of the neural network, the operation further comprising:
modifying the count based on a feature in the spectral feature vector, wherein the modified count is configured to increase a likelihood that the neural network will correctly detect the presence of the keyword in the speech.

13. The computer program product of claim 8, wherein the neural network generates an output comprising an indication of the presence of keywords, and not phonemes, in the speech, wherein the method detects the keyword in the speech without using a hidden Markov model.

14. A system, comprising:
a computer processor; and
a memory containing a program, which when executed by the computer processor, performs an operation to detect a keyword in speech, the operation comprising:
generating, from a sequence of spectral feature vectors generated from the speech, a plurality of blocked feature vector sequences, wherein each of the plurality of blocked feature vector sequences comprises a respective subset of the plurality of feature vectors, wherein each of the plurality of blocked feature vector sequences overlap adjacent blocked feature vector sequences by a predefined count of feature vector sequences; and
analyzing, by a neural network, each of the plurality of blocked feature vector sequences to detect the presence of the keyword in the speech.

15. The system of claim 14, the operation further comprising:
prior to generating the blocked feature vector sequences:
receiving a speech signal comprising the speech; and
performing a feature computation on the speech signal to generate the sequence of spectral feature vectors.

16. The system of claim 14, wherein an output of the neural network comprises a sequence of labels, wherein each of the sequence of labels indicates whether the keyword is present in a corresponding blocked feature vector sequence, the operation further comprising:
smoothing the sequence of labels to determine whether the keyword is in the speech.

17. The system of claim 14, wherein the neural network comprises a plurality of blocks, wherein each block of the neural network is configured to process a respective block of the plurality of blocked feature vector sequences.

18. The system of claim 17, wherein a count of the subset of the plurality of feature vectors in each block of the plurality of blocked feature vector sequences is defined during a training phase of the neural network, wherein the neural network generates an output comprising an indication of the presence of keywords, and not phonemes, in the speech, wherein the method detects the keyword in the speech without using a hidden Markov model, the operation further comprising:
modifying the count based on a feature in the spectral feature vector, wherein the modified count is configured to increase a likelihood that the neural network will correctly detect the presence of the keyword in the speech.

19. A method to detect a keyword in speech, comprising:
generating, from a sequence of spectral feature vectors generated from the speech, a plurality of blocked feature vector sequences;
generating, by a neural network executing on one or more computer processors and based on each of the plurality of blocked feature vector sequences, a sequence of labels, wherein each label of the sequence of labels indicates whether the keyword is present in a corresponding blocked feature vector sequence; and smoothing the sequence of labels to determine whether the keyword is in the speech.

20. A computer program product to detect a keyword in speech, the computer program product comprising:

a non-transitory computer-readable storage medium having computer-readable program code embodied therewith, the computer-readable program code executable by a processor to perform an operation comprising:

generating, from a sequence of spectral feature vectors generated from the speech, a plurality of blocked feature vector sequences;

generating, by a neural network executing on one or more computer processors and based on each of the plurality of blocked feature vector sequences, a sequence of labels, wherein each label of the sequence of labels indicates whether the keyword is present in a corresponding blocked feature vector sequence; and smoothing the sequence of labels to determine whether the keyword is in the speech.

21. A system, comprising:

a computer processor; and a memory containing a program, which when executed by the computer processor, performs an operation to detect a keyword in speech, the operation comprising:

generating, from a sequence of spectral feature vectors generated from the speech, a plurality of blocked feature vector sequences;

generating, by a neural network executing on one or more computer processors and based on each of the plurality of blocked feature vector sequences, a sequence of labels, wherein each label of the sequence of labels indicates whether the keyword is present in a corresponding blocked feature vector sequence; and smoothing the sequence of labels to determine whether the keyword is in the speech.

* * * * *

UNITED STATES PATENT AND TRADEMARK OFFICE
CERTIFICATE OF CORRECTION

PATENT NO. : 9,570,069 B2  Page 1 of 1
APPLICATION NO. : 14/481372
DATED : February 14, 2017
INVENTOR(S) : Jill F. Lehman et al.

It is certified that error appears in the above-identified patent and that said Letters Patent is hereby corrected as shown below:

In the Claims

In Column 11, Line 44, in Claim 9, delete "comprising" and insert -- comprising: --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*